Aug. 19, 1969  H. A. HALEY  3,461,500
EXTRUSION APPARATUS
Filed March 2, 1967

United States Patent Office 3,461,500
Patented Aug. 19, 1969

3,461,500
EXTRUSION APPARATUS
Harold A. Haley, Secane, Pa., assignor to FMC Corporation, Philadelphia, Pa., a corporation of Delaware
Filed Mar. 2, 1967, Ser. No. 620,137
Int. Cl. B29d 23/04
U.S. Cl. 18—14                    2 Claims

ABSTRACT OF THE DISCLOSURE

Tubular film extrusion apparatus having a mandrel supported within and in spaced relationship with a die body by pads covered with chemically inert, non-metallic, heat resistant plastic material.

---

Figures 1, 2, 3:
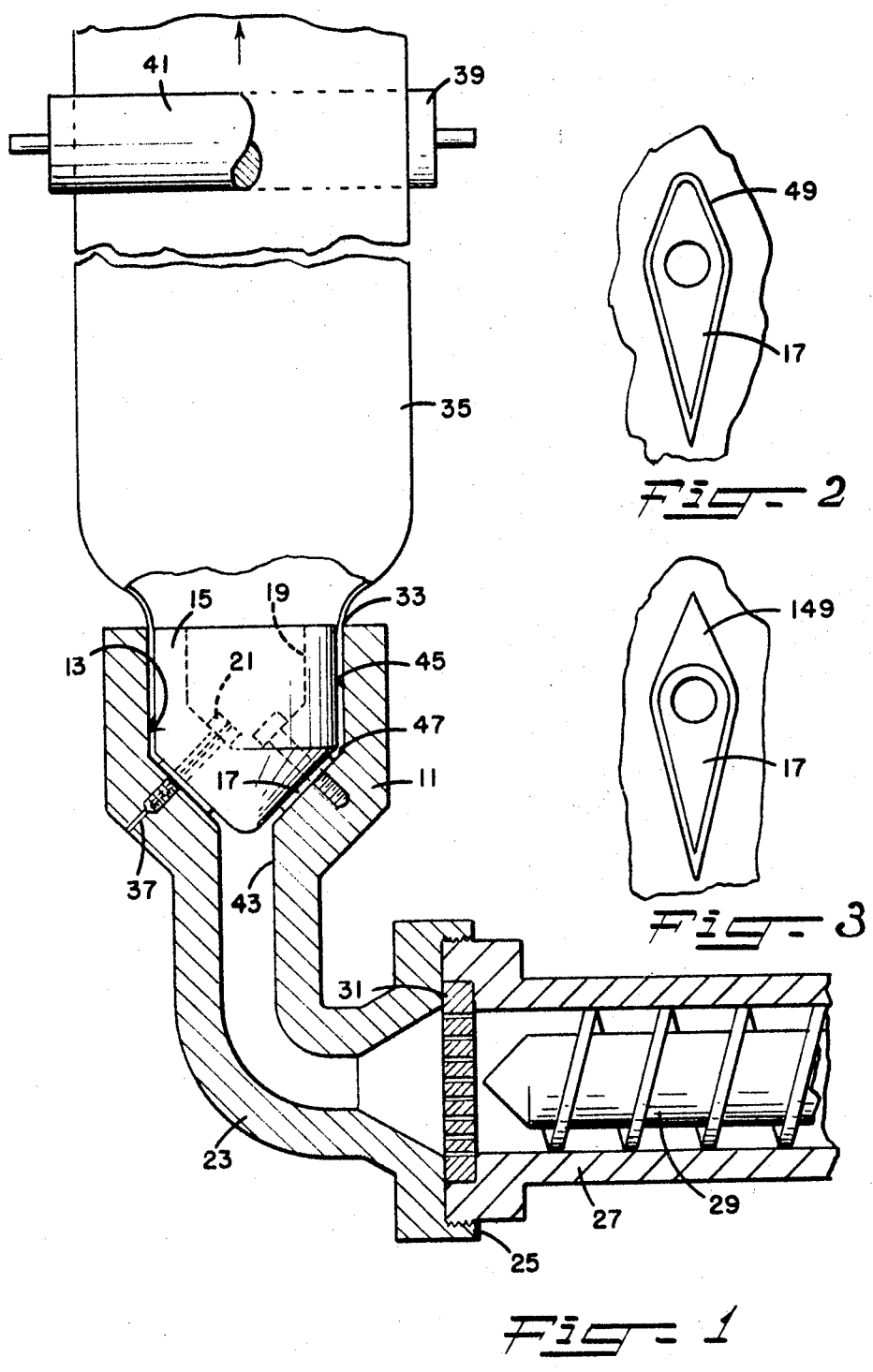

The present invention relates to an improved apparatus for extruding molten thermoplastic material into the form of a tubular film.

Conventional apparatus for making tubular films from molten thermoplastic material includes a center-fed circular die having a die body, a mandrel positioned within an opening in the die body and a series of spaced pads for supporting the mandrel in spaced relationship with the die body to thereby define an extrusion orifice. Generally, the opening in the die body has a cylindrical feed section which is connected to a cylindrical discharge section of larger diameter by a conical section. The configuration of the mandrel conforms substantially with the discharge and conical sections of the die body opening and the mandrel supporting pads are located along the conical section of such opening.

In the use of this conventional apparatus, molten thermoplastic material is delivered into the feed section of the die body opening, flows inbetween and around the mandrel supporting pads, and issues from the extrusion orifice as a tubular film which is then quenched and usually stretched to achieve molecular orientation. The presence of the mandrel supporting pads and the tendncy for the molten thermoplastic material to stick to such pads causes a reduction in the flow of the molten thermoplastic material at the pad locations. This reduced flow, taken with inadequate mixing of the molten thermoplastic material after it flows beyond the pads, results in irregularities in the finished tubular film, which are generally referred to as "die-lines." Such irregularities alter the physical properties and are visible in the finished tubular film, and generally make the subsequent operations, such as stretching and winding very difficult.

The problems created by the mandrel supporting pads are well recognized and while streamlining of such pads has been helpful, much improvment is still needed to provide for a more satisfactory tubular film.

An additional problem encountered with a conventional extrusion apparatus, and one which is overlooked, is that molten thermoplastic material very often becomes lodged in the areas at which the supporting pads contact with the die body. These pads are usually formed as part of the mandrel and it is extremely difficult to machine the surfaces of the same to the exact conical contour of the walls of the die body opening. Thus any slight imperfection in the surfaces of the pads is readily filled by the molten thermoplastic material. Moreover, this problem is further complicated by the tendency of the mandrel, and its supporting pads, to be dislodged or lifted away from the die body under the generally high pressure applied to the molten thermoplastic material during extrusion operations, even though it is snugly bolted in place.

With the die body, mandrel and supporting pads all being heated to a high temperature the stagnant thermoplastic material between the die body and supporting pad surfaces, is rapidly degraded and chars. The degraded material can begin an auto-catalytic degradation in the die, especially, with vinylchloride type polymers. The charred material makes die cleaning difficult and time consuming and generally requires the use of sharp chisel-like tools which tend to nick or otherwise damage the die body. Bits of the charred material often flake off during the extrusion operation and either appear in and render the extruding tubing defective, or lodge in the die orifice and thus interrupt extrusion operations. Accordingly, a primary object of this invention is to provide an improved and more satisfactory extrusion apparatus for making tubular film.

Another object is the provision of an improved extrusion apparatus within which flow disturbances of the material being extruded are minimized.

Still another object is an improved extrusion apparatus which provides for generally continuous and uniform flow of the material being extruded and prevents such material from stagnating and degrading within the extrusion apparatus itself.

A further object is the provision of an improved extrusion apparatus which is simple in construction and easy to clean.

In the drawing, FIGURE 1, is a vertical section taken through an extrusion apparatus which incorporates the improved mandrel supporting pads of the present invention;

FIGURE 2, is an end view, on an enlarged scale, of a mandrel supporting pad employed in the apparatus shown in FIGURE 1; and FIGURE 3 is a view similar to FIGURE 2 illustrating a modified mandrel supporting pad.

The above and other objects of the invention are achieved by an extrusion apparatus having a die body and mandrel in which the mandrel is supported by a series of pads, each being encased by a sleeve of chemically inert, non-metallic, heat resistant plastic material. More particularly, the supporting pads are covered by sleeves formed of polytetrafluoroethylene, "Teflon," which allows the material being extruded to flow smoothly, uniformly, and without sticking to the supporting pads, and thus encourages proper blending or mixing of such thermoplastic material after it has traveled beyond such pads.

As with conventional extrusion apparatus, the series of pads of the apparatus of the present invention support the mandrel within an opening in the die body so that the die body and mandrel together provide an extrusion orifices of desired size. The die body opening includes a cylindrical feed section into which a molten thermoplastic material is first delivered, a discharge section which is also cylindrical but larger in diameter than the feed section, and a conical section which connects the feed and discharge sections. The mandrel configuration conforms with the discharge, and conical sections of the die body opening within which it is supported. The mandrel supporting pads are preferably of streamlined shape so as to minimize flow disturbances in the molten thermoplastic material as it flows relative thereto and are located along the conical section of the die body opening. The number of mandrel supporting pads can be varied, with usually three or four of such pads being sufficient.

The sleeves on the mandrel supporting pads provide a continuous covering around the periphery of the pads and are of such length as to snugly engage with the exposed walls of the die body opening and mandrel. In effect, the ends of these sleeves serve as seals which prevent the material which is being extruded from seeking into the areas between the supporting pads and the adjacent surfaces of the extrusion apparatus with which such pads are engaged. Actually, the presence of the sleeves leaves no surface of the supporting pads exposed to the molten thermoplastic material which is being extruded. The mandrel supporting pad sleeves are preferably, but not necessarily, of preformed construction so as to permit easy replacement of the same.

Referring now to the drawing, the extrusion apparatus illustrated includes a die body 11 having an opening 13 within which a mandrel 15 is supported by a series of integrally formed pads 17. The mandrel 15 has an opening at 19 through which bolts 21 are inserted for securing the mandrel 15 snugly in place. The die body 11 is connected by an elbow 23 and coupling 25 to a barrel 27 of a conventional extruder having a feed screw 29. A breaker plate 31 is positioned at the outlet end of the barrel 27. All of the parts thus far mentioned are formed of metal.

The operation of the apparatus thus far described involves feeding molten thermoplastic material by means of the screw 29 through the barrel 27, breaker plate 31 and elbow 23 into the opening 13 of the die body 11. This molten thermoplastic material flows around and beyond the mandrel supporting pads 17 and issues from orifice 33, as provided by the die body 11 and mandrel 13, as a tubular film 35. Suitable cooling means, not shown, may be provided for quenching the tubular film as it issues from the extrusion apparatus. As in conventional procedures, the tubular film 35 may be expanded by a gas which is delivered into the mandrel opening 19 through a conduit 37 extending through one of the bolts 21. This gas is contained by collapsing the cooled tubular film upon itself by nip rollers 39 and 41. After passing between the nip rollers 39 and 41, the now cooled and stretched tubular film may be collected in the usual manner.

As illustrated and heretofore described, the die body opening 13 includes a cylindrical feed section 43 into which the molten thermoplastic material is first delivered, a discharge section 45 which is also cylindrical but of larger diameter than the feed section 43 and an intermediate conical section 47. The mandrel is shaped to conform with the discharge and conical sections 45 and 47 of the die body opening and the mandrel supporting pads 17 engage with the wall of the conical section 47. The bolts 21, as heretofore mentioned, lock the mandrel 15 to the die body 11.

Shown on an enlarged scale in FIGURE 2, the mandrel supporting pads 17 are of conventional streamlined shape and are each encased within a sleeve 49 of inert, non-metallic, heat-resistant plastic material which can withstand the extrusion conditions. Preferably, the sleeves 49 are formed of polytetrafluoroethylene to which the molten thermoplastic material will not stick and which encourages smooth and uniform flow of such molten material around and beyond the supporting pads. The sleeve 49 provides a continuous covering on the pads 17 and are each of such length as to snugly engage with the surfaces of the die body, and thus serve also as seals which prevent molten thermoplastic material in the areas at which the pads contact from seeping in-between the die body 11 and pads 17. The sleeves 49 may be of uniform thickness, and therefore conform in shape with the pads 17 to which they are applied, or may differ therefrom to improve the flow characteristics and/or mixing of the molten thermoplastic material as it travels past such pads. For example, in the modification shown in FIGURE 3, the mandrel supporting pad 17 is of the same construction as shown in FIGURE 2, while its covering sleeve 149 of polytetrafluoroethylene is thickened at one end to provide for a smooth blending of the particular molten thermoplastic material which is being extruded.

It is to be understood that changes and variations may be made without departing from the spirit and scope of the invention as defined in the appended claims.

I claim:
1. In an apparatus for extruding molten thermoplastic material having a metallic die body, walls defining an opening in said die body having a cylindrical feed section, a cylindrical discharge section of larger diameter than the feed section and terminating at one end of the die body, and a conical section connecting said feed and discharge sections, means for delivering molten thermoplastic material into the feed section of the die body opening, a metallic mandrel positioned within and having a configuration conforming substantially with the discharge and conical sections of the die body opening, and metallic pads positioned within the conical section of the die body opening for supporting the mandrel in spaced relationship with the die body to provide an extrusion orifice; the improvement comprising a sleeve formed of chemically inert, non-metallic, heat-resistant, material encasing each of said pads and engaged snugly at its ends with the mandrel and walls of the body opening to seal any areas between said pads and the adjacent walls of the mandrel and die body against the entry of molten thermoplastic material.

2. In an apparatus as described in claim 1, wherein said sleeves are formed of polytetrafluoroethylene.

References Cited

UNITED STATES PATENTS

| | | |
|---|---|---|
| 2,403,476 | 7/1946 | Berry et al. |
| 2,799,045 | 7/1957 | Hillegas. |
| 3,122,786 | 3/1964 | Huisman. |
| 3,229,005 | 1/1966 | Reifenhauser. |
| 3,284,849 | 11/1966 | Coleman et al. |

WILLIAM J. STEPHENSON, Primary Examiner